(12) United States Patent
Owen, III et al.

(10) Patent No.: US 11,561,276 B2
(45) Date of Patent: Jan. 24, 2023

(54) BI-STATIC OPTICAL TRANSMIT RECEIVE AUTO-BORESIGHT TECHNIQUE COMPRISING AN ELEVATION ASSEMBLY OPERABLE TO MOVE FIRST SCAN MIRROR AND SECOND SCAN MIRROR IN UNISON

(71) Applicant: BAE Systems Information and Electronic Systems Integration Inc., Nashua, NH (US)

(72) Inventors: Joseph M. Owen, III, Merrimack, NH (US); Jeffrey L. Jew, Brookline, NH (US); Ian B. Murray, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 150 days.

(21) Appl. No.: 17/317,436

(22) Filed: May 11, 2021

(65) Prior Publication Data

US 2022/0365162 A1 Nov. 17, 2022

(51) Int. Cl.
*G01S 7/48* (2006.01)
*G01S 3/786* (2006.01)
*G02B 26/10* (2006.01)
*G02B 26/08* (2006.01)

(52) U.S. Cl.
CPC ........ *G01S 3/7864* (2013.01); *G02B 26/0816* (2013.01); *G02B 26/10* (2013.01)

(58) Field of Classification Search
CPC . G01S 7/48; G01S 17/42; G01S 17/88; G02B 17/00; G02B 19/00; G02B 26/10; G01C 3/00; G01C 3/04
USPC .................................................. 250/216, 239
See application file for complete search history.

(56) References Cited

U.S. PATENT DOCUMENTS

| | | | |
|---|---|---|---|
| 7,697,125 B2 * | 4/2010 | Swenson | G02B 19/0028 356/141.5 |
| 2004/0233420 A1 | 11/2004 | DeFlumere et al. | |
| 2007/0152897 A1 | 7/2007 | Zimmerman et al. | |
| 2016/0047896 A1 | 2/2016 | Dussan | |
| 2017/0307876 A1 | 10/2017 | Dussan et al. | |

OTHER PUBLICATIONS

International Search Report, PCT/US22/28452, dated Aug. 24, 2022, 7 pages.

\* cited by examiner

*Primary Examiner* — Que Tan Le
(74) *Attorney, Agent, or Firm* — Sand, Sebolt & Wernow LPA

(57) ABSTRACT

A bi-static optical system utilizing a separate transmit and receive optical train that are identically steerable in azimuth-over-elevation fashion while accommodating an autoboresight technique and function. Further provided may be a common elevation assembly with two opposite-facing elevation fold mirrors on either side that are controlled by the same motor assembly allowing for common elevation control without overlapping or combining the apertures.

20 Claims, 6 Drawing Sheets

BI-STATIC OPTICAL TRANSMIT RECEIVE AUTO-BORESIGHT TECHNIQUE COMPRISING AN ELEVATION ASSEMBLY OPERABLE TO MOVE FIRST SCAN MIRROR AND SECOND SCAN MIRROR IN UNISON

STATEMENT OF GOVERNMENT INTEREST

This invention was made with government support under Contract No. 19-C-8906 awarded by a classified agency. The government has certain rights in the invention.

TECHNICAL FIELD

The present disclosure relates generally to the field of bi-static optical systems utilizing an azimuth/elevation gimbal. More particularly, in one example, the present disclosure relates to a system and technique for autoboresight calibration of a bi-static optical system. Specifically, in another example, the present disclosure relates to a bi-static optical transmit and receive autoboresight technique using a separate transmit and receive optical train having a shared elevation assembly with opposite-facing elevation fold mirrors to allow for common elevation control in the transmit and receive optical trains.

BACKGROUND

Optical sensor systems, laser pointing systems, and/or Coudé mirror-type pointing systems have a wide variety of applications, including light detection and ranging (LiDAR) optical pointing systems, and optical communication systems, and the like. Many of these systems utilize a bi-static system, i.e. systems with separate transmit and receive apertures, integrated on a shared azimuth/elevation gimbal. These systems may be used for precision tracking and alignment of simultaneous transmission and reception of light beams as used in such applications. While most of these systems are highly efficient in isolating the transmit side of the optical train from the receiver optical system, it is difficult to both know and predict the location of the transmit laser beam after it leaves the azimuth mirror. This problem is exacerbated by the bi-static nature of these systems as they lack a common optical train.

Prior systems, therefore, tend to include a means to fold a portion of the transmit beam back into the receiver at the location where the two apertures are combined. This technique is commonly known as autoboresight and it assures that the receive end Tx signals are co-registered on the receiver and the receiver is then able to measure the transmit beam alignment prior to entering the common optical train of a pointer. This solution, however, can cause stray-light scatter from the transmitter source to reach and impact the receiver and may further suffer from additional imperfections due to comprises needed in the beam combining elements. As mentioned above, in bi-static systems, where there is no common optical train or common path transmit/receiver combiner, there are few ways to perform autoboresight without adding such a common optical element; however, adding a common element back into the system re-introduces the risk of stray-light scatter from the transmitter source reaching the receiver.

In systems with a common optical element, a transmit and receive path can be locked together so that they steer "identically", i.e. the mechanism steers them both simultaneously and notionally in the same direction. This is commonly accomplished by having 2 beamlines controlled by a common elevation assembly. This may introduce an additional error into such systems as it is usually difficult to be certain that the transmit and receive paths are aimed in the same direction with high precision, in addition to suffering the stray-light induced issues described above.

Thus, existing solutions commonly suffer from these stray-light induced problems, which not only compromise autoboresight functionality but may also affect other receiver functions negatively. For example, these prior solutions result in systems that lack in ability to limit diffraction of the autoboresight spot in cases where the transmit aperture is the same size or larger than the receive aperture.

SUMMARY

The present disclosure addresses these and other issues by providing a bi-static optical system utilizing a separate transmit and receive optical train that are identically steerable in azimuth-over-elevation fashion while accommodating an autoboresight technique and function. The present disclosure may further provide a common elevation assembly with two opposite-facing elevation fold mirrors on either side that are controlled by the same motor assembly allowing for common elevation control without overlapping or combining the apertures.

In one aspect, an exemplary embodiment of the present disclosure may provide a method of performing autoboresight on an optical system comprising: providing a transmission signal; reflecting a first portion of the transmission signal off of a first scan mirror in operable communication with an elevation assembly carried on an azimuth platter of an optical system; directing a second portion of the transmission signal through the first scan mirror into the elevation assembly and out of the elevation assembly through a second scan mirror in operable communication with the elevation assembly; detecting a receiver signal with an optical receiver on the azimuth platter; and detecting the second portion of the transmission signal with the optical receiver after it exits the elevation assembly through the second scan mirror. This exemplary embodiment or another exemplary embodiment may further provide determining a desired position of the first portion of the transmission signal relative to the optical system. This exemplary embodiment or another exemplary embodiment may further provide determining an actual position of the first portion of the transmission signal relative to the optical system from the second portion of the transmission signal and the receiver signal detected by the optical receiver. This exemplary embodiment or another exemplary embodiment may further provide adjusting at least one of the elevation and azimuth position of the transmission signal based on the actual position thereof. This exemplary embodiment or another exemplary embodiment may further provide wherein adjusting the elevation position of the transmission signal further comprises: rotating the elevation assembly to change the elevation of the first and second scan mirrors. This exemplary embodiment or another exemplary embodiment may further provide wherein adjusting the azimuth position of the transmission signal further comprises: rotating the azimuth platter to change the azimuth position of the first and second scan mirrors. This exemplary embodiment or another exemplary embodiment may further provide wherein adjusting at least one of the elevation and azimuth position of the transmission signal is performed automatically. This exemplary embodiment or another exemplary embodiment may further provide wherein reflecting the first portion of the transmission signal off of the first scan mirror further comprises: reflecting the first portion of the transmission signal to a target remote from the optical system. This exemplary embodiment or another exemplary embodiment may further provide wherein detecting the receiver signal with the optical receiver further comprises: receiving a target reflection of the first portion of the transmission signal returning from the target, wherein the target reflection defines the receiver signal after reflecting off of the target; and directing the receiver signal through a receiver optical train on the azimuth platter via the second scan mirror. This exemplary embodiment or another exemplary embodiment may further provide wherein the receiver optical train is entirely contained on the azimuth platter. This exemplary embodiment or another exemplary embodiment may further provide wherein providing the transmission signal further comprises: generating the transmission signal from a signal source remote from the azimuth platter; and directing the transmission signal through a transmit optical train that includes the first scan mirror. This exemplary embodiment or another exemplary embodiment may further provide separating the transmission signal from the receiver signal with at least one baffle.

In another aspect, an exemplary embodiment of the present disclosure may provide an optical system comprising: a receiver optical train carried on an azimuth platter; a transmit optical train separate from the receiver optical train; an elevation assembly having a first scan mirror that is included in the receiver optical train and a second scan mirror that is included in the transmit optical train, wherein the elevation assembly is operable to move the first and second scan mirrors in unison; and an optical receiver of the receiver optical train operable to detect at least a portion of a transmission signal passing through the elevation assembly and a receiver signal from the receiver optical train simultaneously. This exemplary embodiment or another exemplary embodiment may further provide a motor controller assembly operable to move the elevation assembly. This exemplary embodiment or another exemplary embodiment may further provide wherein the azimuth platter further comprises: an aperture defined therethrough operable to allow the transmission signal to pass therethrough. This exemplary embodiment or another exemplary embodiment may further provide wherein the azimuth platter is rotatable about a central vertical axis to adjust a position of the transmission signal and the receiver optical train simultaneously. This exemplary embodiment or another exemplary embodiment may further provide at least one fold mirror in the receiver optical train operable to direct the receiver signal to the optical receiver; and at least one fold mirror in the transmit optical train operable to direct the transmission signal through a transmit window towards a target. This exemplary embodiment or another exemplary embodiment may further provide a first fast scanning mirror included in the receiver optical train; and a second fast scanning mirror that is included in the transmit optical train. This exemplary embodiment or another exemplary embodiment may further provide at least one optical filter in the elevation assembly. This exemplary embodiment or another exemplary embodiment may further provide at least one baffle separating the receiver optical train from the transmit optical train.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
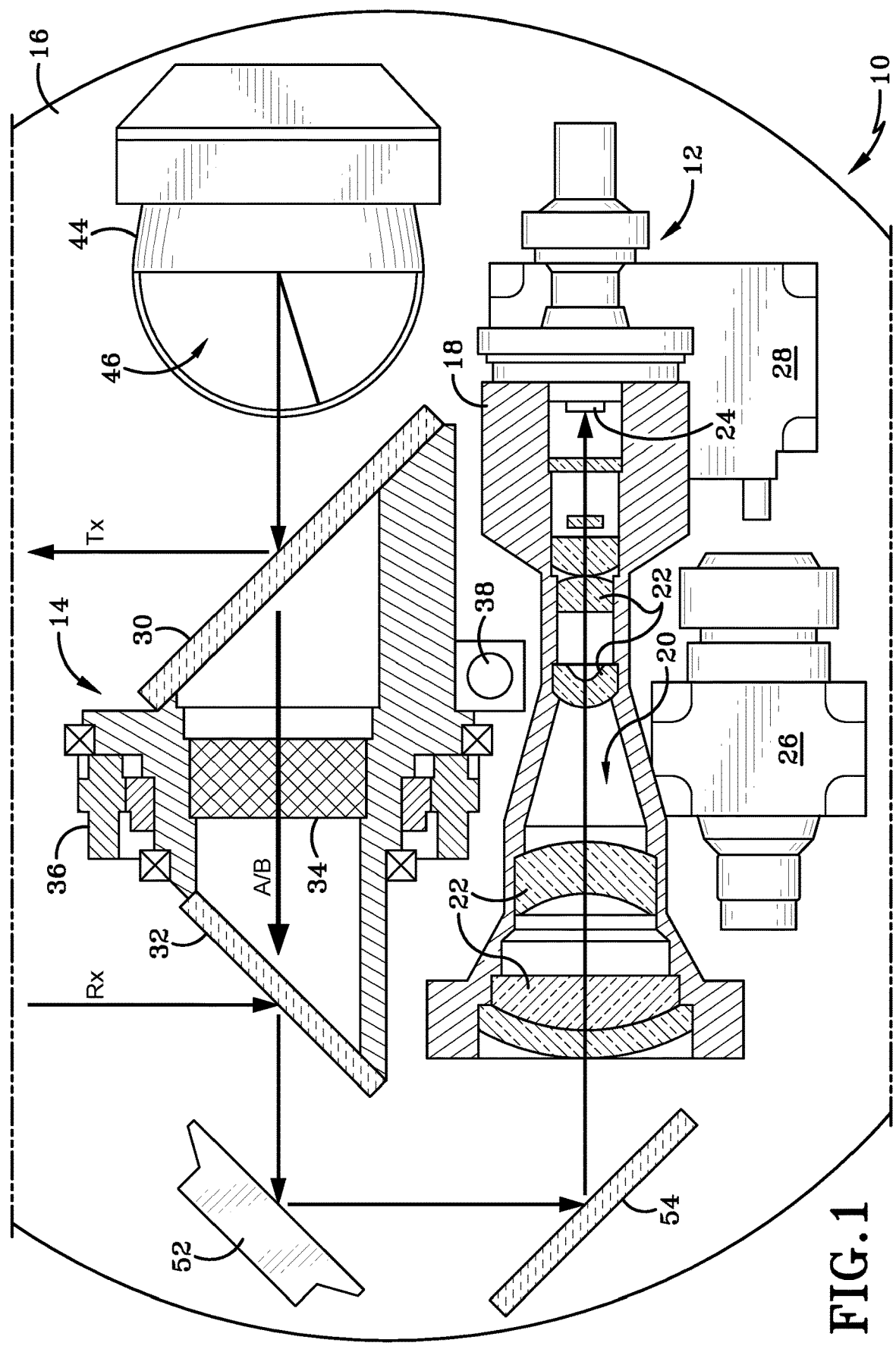
FIG. 1 is a top cross-section view of an exemplary optical system, according to one aspect of the present disclosure.

With reference to FIG. 1, a bi-static optical system is shown and generally indicated at reference 10. The bi-static optical system 10, or simply optical system 10, is so named in that the transmission (Tx) optical train and receiver (Rx) optical train are separate. Optical system 10, at its most basic, may include a camera or receiver 12 and an elevation assembly 14 carried on an azimuth platter 16. Optical system 10 may further include a plurality of optical components, including one or more mirrors, or the like. These optical components will be discussed in more detail below in relation to their relative placement and/or operation within optical system 10.

Optical system 10 may have an entirely separate Tx and Rx optical trains that are identically steerable in azimuth-over-elevation fashion and may further accommodate the autoboresight function, as discussed further herein. More particularly, the Tx optical train may be a Coudé path, which may transfer the transmit beam from the elevation axis to the azimuth axis while the entire Rx receiver 12 and elevation assembly 14 may be contained on a top of the azimuth platter 16, as discussed further below with respect to the operation of optical system 10. According to one aspect, the Coudé path may be a path wherein the Tx signal is bent around the major axis (e.g. the azimuth axis) to reach the minor axis (e.g. the elevation axis) utilizing one or more mirrors (such as mirrors 42, described below).

Receiver 12 may be an optical receiver and may further include a body 18, which may house various individual components within an optical chamber 20 including one or more camera optics 22. According to one aspect, receiver 12 may be a telescope or telescopic camera having a plurality of optics 22 disposed within body 18 as to create or otherwise define an optical path through the optical chamber 20 therein. Receiver 12 may further include one or more sensors 24, which may be a focal plane array (FPA) or the like. Sensors 24 may be any suitable sensor operable to detect light waves entering receiver 12 and traveling through optical chamber 20 to the sensor 24. As used herein, sensor 24 may be best understood as an FPA and will be referred to as FPA 24; however, it will be further understood that references to FPA 24 may include any suitable sensors unless specifically stated otherwise. Where sensor 24 is an FPA 24, it may be a standard FPA 24 having a plurality of individual pixels, which may be arranged in a suitable pattern. The number, size, and/or arrangement of these pixels may vary depending upon the desired implementation and installation and parameters.

Receiver 12 may be operable to detect light waves in any suitable and/or desired wavelength, including visible light, infrared light, or any other desired wavelength. Where appropriate, such as in installations detecting infrared wavelengths, receiver 12 may be cooled. According to this aspect, receiver 12 may then further include a cooler 26 and associated cooler electronics 28, all of which may be carried on azimuth platter 16, as discussed further herein. According to one aspect, cooler 26 may be a cold finger cooler, a Dewar cold finger, a cryo-pump, or the like, and further may utilize any suitable coolant including liquid nitrogen, helium, or similar coolants. According to other aspects, where not desired or necessary, optical system 10 may omit cooler 26 and cooler electronics 28.

Optics 22 within receiver 12 may be or include one or more optical lenses through which light may pass as it enters and travels through optical chamber 20 towards FPA 24. Optics 22 may be any standard optics of any shape as dictated by the implementation parameters. For example, optics 22 may be shaped as biconvex, plano-convex, positive meniscus, negative meniscus, plano-concave, or bio concave lenses, or the like. The specific order, orientation, arrangement, and/or type of optical lenses used for optics 22 may also vary depending on the particular implementation and installation parameters, and type and wavelength of light being detected by FPA 24. Optics 22 may be further shaped, sized, placed and/or arranged to direct and/or focus light entering optical chamber 20 of receiver 12 onto FPA 24, as dictated by the desired implementation. Optics 22 may further include one or more converging lenses and/or diverging lenses to concentrate and/or spread light beams as they pass therethrough, as desired.

Receiver 12 and/or FPA 24 may be operationally connected to a computer or processor including one or more non-transitory storage mediums and one or more microprocessors or logics capable of carrying out and executing a set of instructions or processes encoded thereon. According to one aspect, receiver 12 and/or FPA 24 may be operationally connected to a computer or processor that is carried on, with, or as part of receiver 12. According to another aspect, an associated computer or processor may be remote from receiver 12 and/or FPA 24 such that receiver 12 and/or FPA 24 may be in wired or wireless communication therewith. The connectivity and communication between receiver 12 and/or FPA 24 with an associated computer or processor may therefore vary depending upon the desired implementation and installation parameters of optical system 10. According to one aspect, an associated computer or processor may be remote from receiver 12 and/or FPA 24 but carried on azimuth platter 16, as desired.

Figure 2:
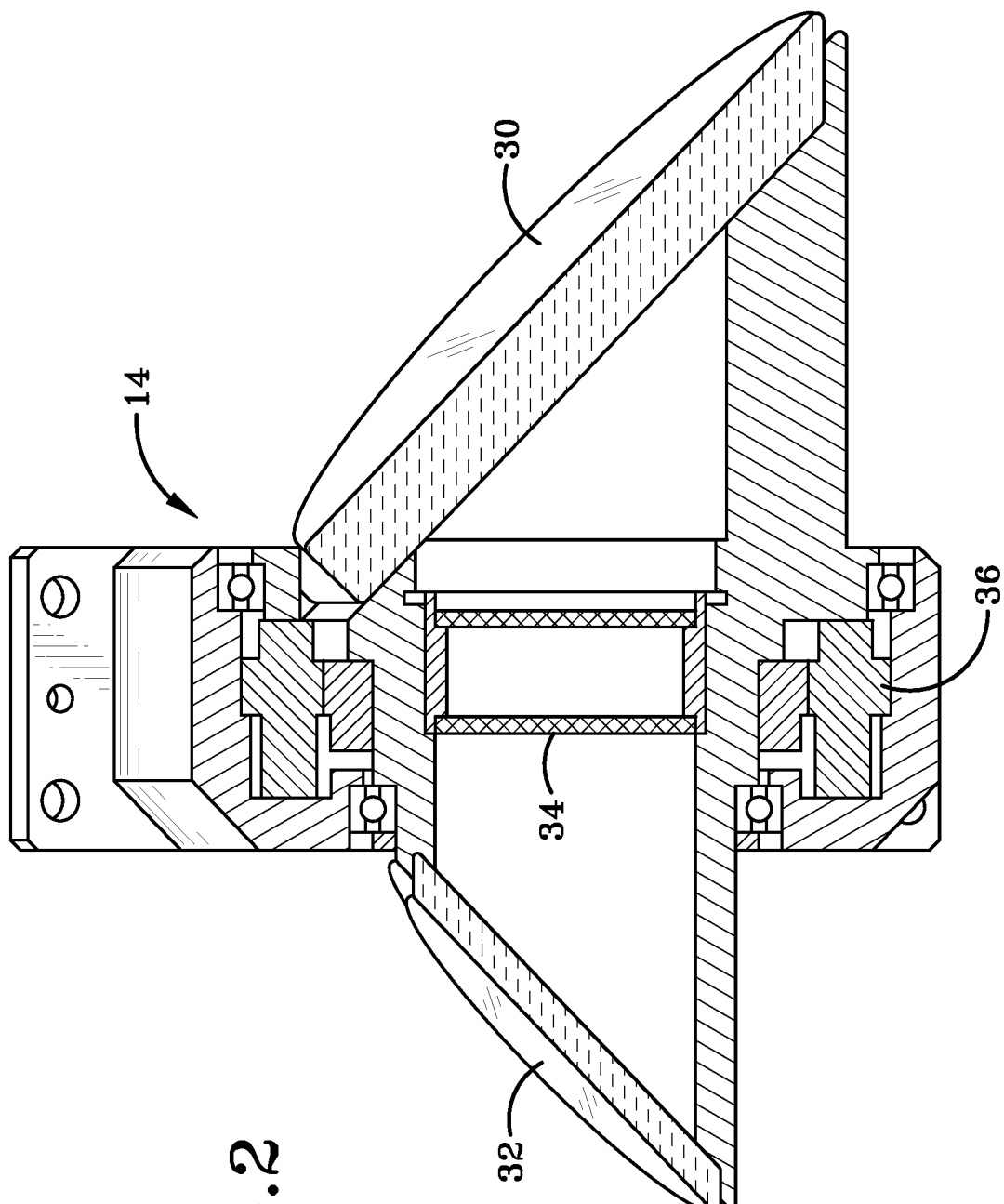
FIG. 2 is a top elevation cross-section view of an exemplary elevation assembly, according to one aspect of the present disclosure.

With reference to FIGS. 1 and 2, elevation assembly 14 may be a staged motor assembly having a pair of opposite-facing elevation fold mirrors on either side. Specifically, elevation assembly 14 may have a transmission scan mirror 30 and a receiver scan mirror 32 opposite thereof. As discussed further below, with relation to the operation thereof, the transmission and receiver mirrors 30 and 32 may be controlled by the same motor controller assembly, such as drive motor 36 to allow for common elevation control without overlapping and/or combining the transmission and receive apertures.

Elevation assembly 14 may have a generally hollow or open interior, which may define an autoboresight path indicated in FIG. 1 by arrow A/B. This autoboresight path or A/B path may generally defined as the path that light may take passing through the elevation assembly 14, as discussed further below. Further contained within elevation assembly 14 may be one or more optical filters 34, which may be any suitable optical filters operable to block or otherwise filter undesired wavelengths from passing therethrough. According to one aspect, optical filters 34 may be attenuating and/or spectral filters, which may provide additional control over light following A/B path.

Drive motor 36 may be a common motor controller or motor controller assembly, which may allow for common elevation control of elevation assembly 14. This may allow both the transmission scan and receiver scan mirrors 30 and 32 to be moved in unison to maintain the proper relative position of the transmission and receiving beams on FPA 24, as discussed further below. Drive motor 36 may be mounted using any suitable mounting technique as dictated by the desired implementation.

Elevation assembly 14 may further include an elevation encoder 38 to permit precise detection of the rotation angle and/or linear displacement of scan mirrors 30 and 32 during operation. Elevation encoder 38 may be any suitable and commercially available encoder as dictated by the desired implementation.

Optical system 10 may further include an azimuth platter 16, which may provide a mounting surface for receiver 12 and elevation assembly 14 along with all other components of the receiving side of optical system 10, as discussed further below. Azimuth platter 16 may be rotatable about a central vertical axis, which may allow up to 360 degrees of rotation, as dictated by the desired implementation. azimuth platter 16 may be rotatably mounted to another structure such as an optical bench or the like as desired and may include any and all necessary elements and components for operation thereof, including, but not limited to motors, bearings, electronic components, electrical components, processing components, or the like. According to one aspect, azimuth platter 16 may be any suitable type and sized platter providing it is of sufficient size to accommodate a receiver, such as receiver 12, thereon without a need for a Coudé Rx optical train to avoid sharing or combining the Tx and Rx optical trains, as discussed further herein. According to another aspect, the size of the azimuth platter 16 may be determined relative to the receiver 12 and the required receiver aperture thereof. According to one non-limiting example, the azimuth platter 16 may be approximately sixteen inches in diameter to accommodate a receiver 12 having an aperture of approximately two inches. According to one aspect, azimuth platter 16 may further include any suitable mounting surfaces, mounting plates, mounting brackets, or the like including additional mounting hardware for securing optical system 10 components thereto.

Azimuth platter 16 may further have an aperture 46 defined therethrough as part of the Tx optical train, as discussed below.

Figure 3:
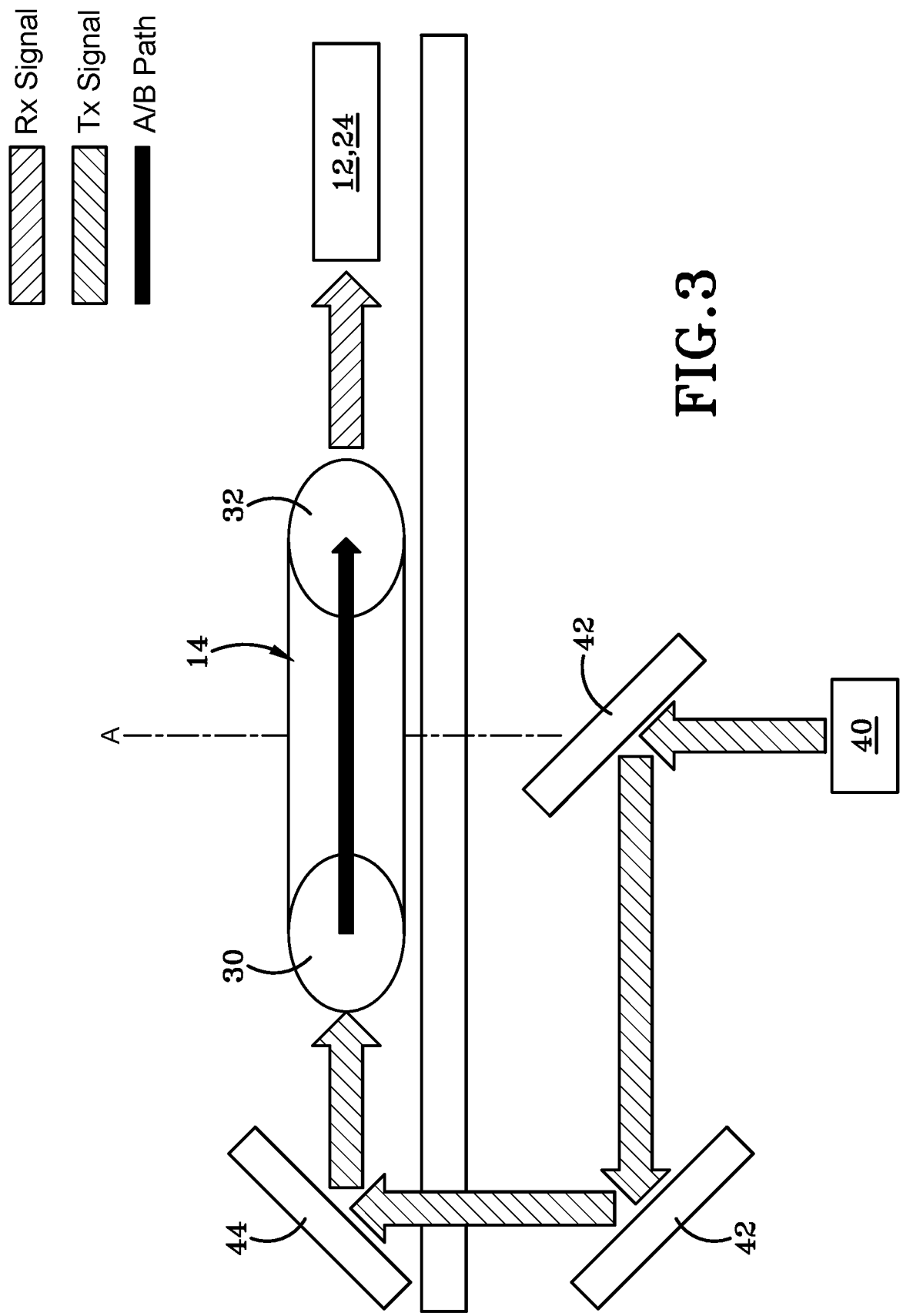
FIG. 3 is a top schematic view of the transmit (Tx) and receiver (Rx) signal paths of an exemplary optical system, according to one aspect of the present disclosure.
Figure 4:
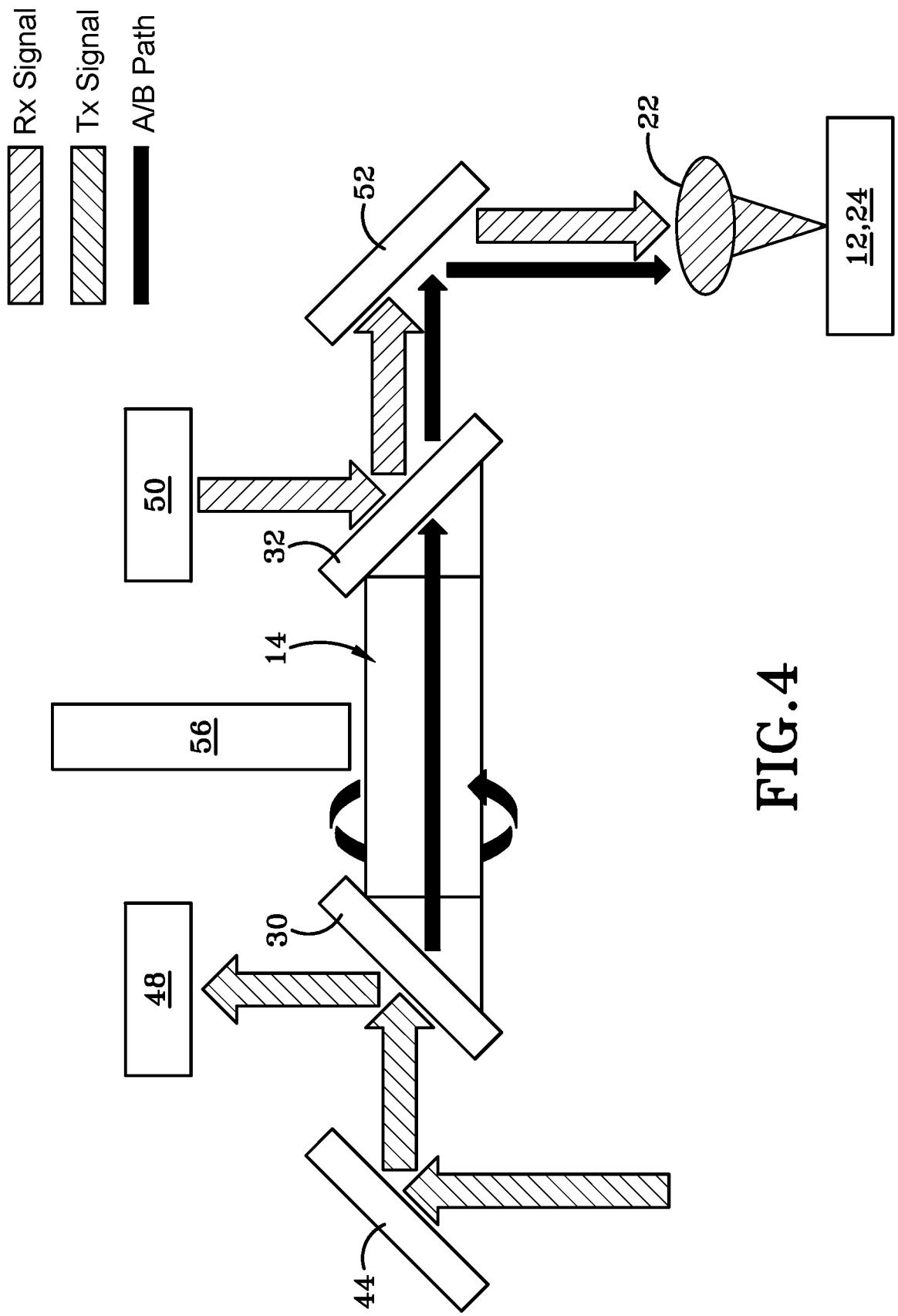
FIG. 4 is a side elevation schematic view of the Tx and Rx signal path of an exemplary optical system, according to one aspect of the present disclosure.

Having thus described the general elements and components of optical system 10, the system 10 will now be further described in relation to the transmit (Tx) beam path and the receive (Rx) beam path, indicated by arrows Tx for transmit beam and Rx for receive beam in FIG. 1 and as identified by the legends in FIGS. 3 and 4.

Accordingly, with reference to FIG. 3, the transmit beam path shown as Tx signal will now be described. The Tx optical train may begin with a Tx signal source 40, which may be a beam generator or the like and may be carried with or as a part of optical system 10, or may alternatively be remote therefrom. The Tx optical train may be a Coudé path style optical train in that the Tx signal may be folded into optical system 10 utilizing one or more fold mirrors 42. Specifically, as seen in FIG. 3, Tx signal may originate from source 40 and may encounter one or more fold mirrors 42, which may alter the direction of the Tx signal causing it to pass through aperture 46 (FIG. 1) defined in azimuth platter 16 before encountering a transmission line of sight stabilization fast steering mirror (FSM) 44. This FSM 44 may then redirect Tx signal to the transmission scan mirror 30 carried by the elevation assembly 14. This transmission scan mirror 30 may simultaneously direct the majority of Tx signal outwards from optical system through transmission window 48 (FIG. 4) while allowing a small amount of energy to pass through the transmission scan mirror 30 and into elevation assembly 14. This energy or light passing through elevation assembly 14 is the light previously mentioned as following or otherwise defining A/B path, which again is the path this light may take through the elevation assembly 14 and out into the Rx optical train, as discussed further below.

While the Tx optical train is folded into optical system 10, the Rx optical train and the relative components therefore may all be carried on the azimuth platter 16 such that the entirety of the Rx optical train may be housed on the azimuth platter 16. Specifically, as best seen in FIG. 4, the Rx signal, indicated as Rx signal therein, may enter optical system 10 through receiver window 50 where it may first encounter the receiver scan mirror 32 before being directed to a receiver line of sight stabilization FSM 52. The receiver FSM 52 may then direct the Rx signal into receiver 12 where it may travel through optical chamber 20 and optical components 22 before reaching the receiver 12 and FPA 24. As shown in FIG. 1, and according to some aspects, Rx path may further include additional receiving fold mirrors such as fold mirror 54 as desired or as dictated by the desired implementation to further direct the Rx signal to the FPA 24 in receiver 12.

With continued reference to FIG. 4, the light that has passed through transmission scan mirror 30 may now be directed down the A/B path and may likewise pass through receiver scan mirror 32 before traveling in parallel to the Rx signal, namely, off of the receiving FSM 52 and to the receiver 12 and FPA 24. Thus, the FPA 24 and receiver 12 can see the Tx signal, which can allow the system to properly align the Tx signal to keep an accurate position. Further, the transmit spot may be moved slightly off center of the receiver or optical axis, if desired, thus providing two separate spots which may prevent interference from the Tx and Rx signals hitting the detector at the same position. This may further allow for more accurate determination of the Tx signal position.

As mentioned herein, elevation assembly 14, having both transmission and receiver scan mirrors 30 and 32 operationally connected thereto, may allow for simultaneous and uniform movement thereof such as the rotation of mirrors to adjust the elevation of each signal. This rotation is indicated by the arrow shown in FIG. 4 and may allow for simultaneous elevation adjustments. Further, the inclusion of elevation assembly 14 and the entire Rx optical train on azimuth platter 16 may provide for simultaneous azimuth adjustment as well, as the Tx and Rx signals will again be moved or rotated about the azimuth axis in unison.

With reference to FIGS. 1-4, the mirrors and other optical components utilized with optical system 10, including receiver optics 22, scan mirrors 30 and 32, fold mirrors 42 and 54, and/or FSMs 44 and 52, or any other optics included as desired, may be precision machined or manufactured from a highly reflective material or may alternatively be coated with a chemical or physical coating to increase reflectivity thereof. According to one aspect, these components may be mirrored glass. As such, particularly in the case of transmit and receive scan mirrors 30 and 32, a metallic substrate may be substituted or replaced with a transmissive substrate, which can permit a small amount of Tx signal to pass therethrough without reducing the Tx signal strength or functionality directed out of transmit window 48, as discussed further herein As seen in FIG. 4, system 10 may further include one or more baffles 56, which may separate transmission window 48 and receiver window 50 as well as the remaining components of Tx optical train and Rx optical train to prevent any unwanted or unintentional leakage of the Tx signal into the Rx optical train other than the specific intentional passing of light down A/B path from the Tx optical train into the Rx optical train, as discussed herein.

Having thus described the elements and components of optical system 10, the operation and method of use therefore will not be described.

Figure 5:
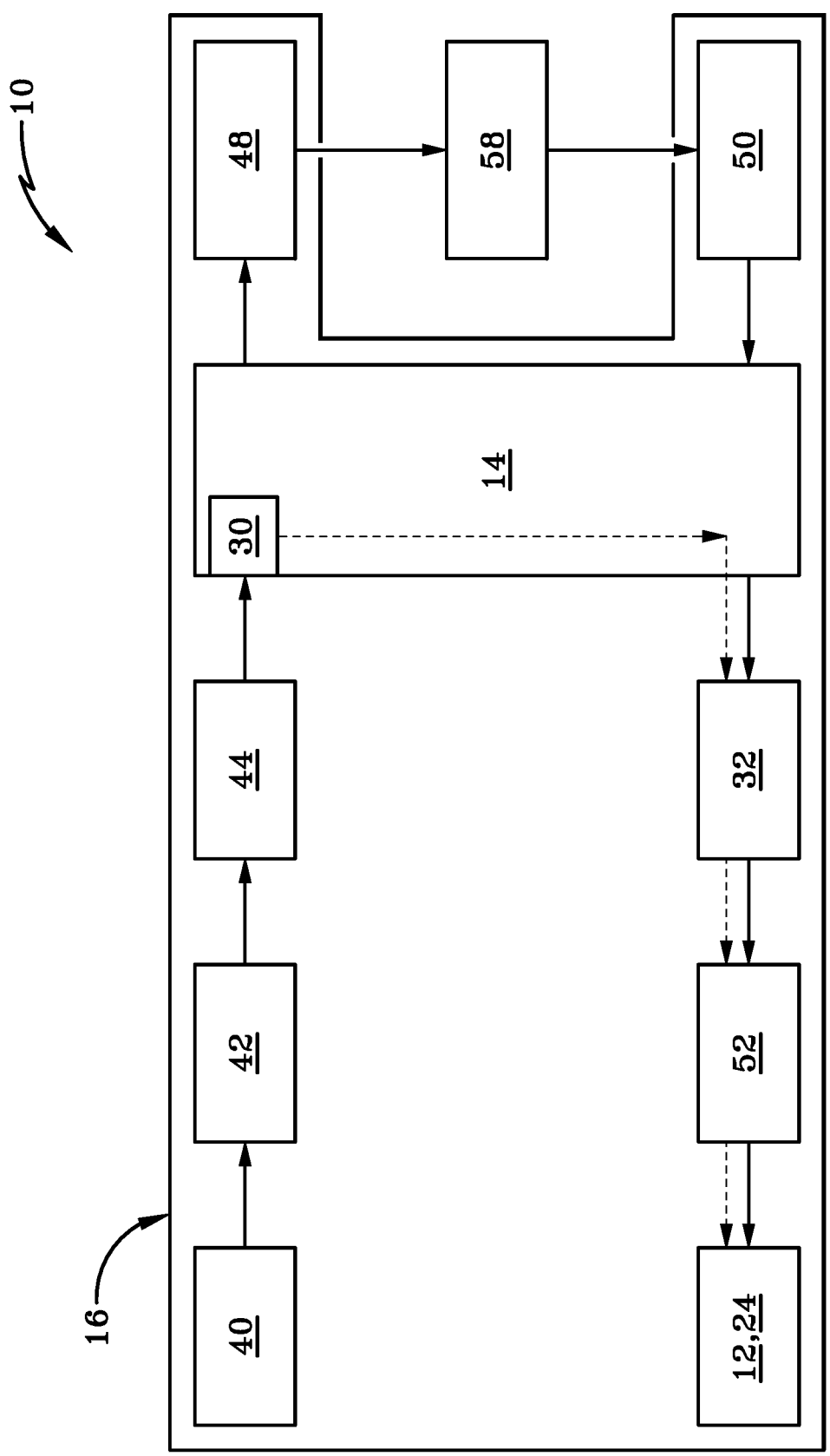
FIG. 5 is a block diagram showing the Tx and Rx path of an exemplary optical system, according to one aspect of the present disclosure.

With reference to FIG. 5, the general function and concept of operation for optical system 10 is shown as a basic block diagram. As shown in FIG. 5, the Tx signal, indicated by the arrows at the top of FIG. 5, is first generated or otherwise provided from transmission source 40 and directed through fold mirror 42 and off of transmission FSM 44 where the signal is then directed to the elevation assembly 14. From there, when the Tx signal encounters the elevation assembly 14, a majority of the signal is reflected off of the transmission scan mirror 30 and out the transmission window 48 while a small amount of the signal is permitted to pass through the elevation assembly 14, as indicated by the dashed line. The majority of the signal that is directed out of transmission window 48 is directed to a target 58, which may be a target surface, another optical system, or any other suitable or desired target, as dictated by the desired implementation. Once the Tx signal encounters target 58, that signal will be reflected back towards optical system 10 from the target as the Rx signal. According to another aspect, the Rx signal may be any other form of detectable radiation emanating from, or otherwise due to, target 58, such as visible light, infrared light, or the like. The Rx signal may then enter optical system 10 through the receiving window 50 before encountering elevation assembly 14 and receiver scan mirror 32. The Rx signal will then travel off of the receiver scan mirror 32 to the receiving fast stabilization mirror 52 before being directed to the FPA 24 in receiver 12, as previously discussed herein. Simultaneously, the light indicated by the dashed arrows in FIG. 5 traveling through elevation assembly from the Tx optical train to the Rx optical train will travel out of elevation assembly 14 through receiver scan mirror 32 and will travel in parallel to the Rx signal, likewise encountering FPA 24 in receiver 12. As previously mentioned herein, this is the A/B path which may provide a reference spot on FPA 24 that allows for the receiver 12 to "see" the Tx signal to calculate the proper position and accuracy of the Tx signal that is directed to target 58.

This solution can eliminate stray-light induced problems in prior optical systems, which not only compromises autoboresight functionality but also could negatively affect other receiver functions. Further, the present optical system 10 allows for much better control of the optical signal, including the ability to have a diffraction—limited autoboresight spot if using a transmit aperture that is the same size or larger than the receiver aperture.

Figure 6:
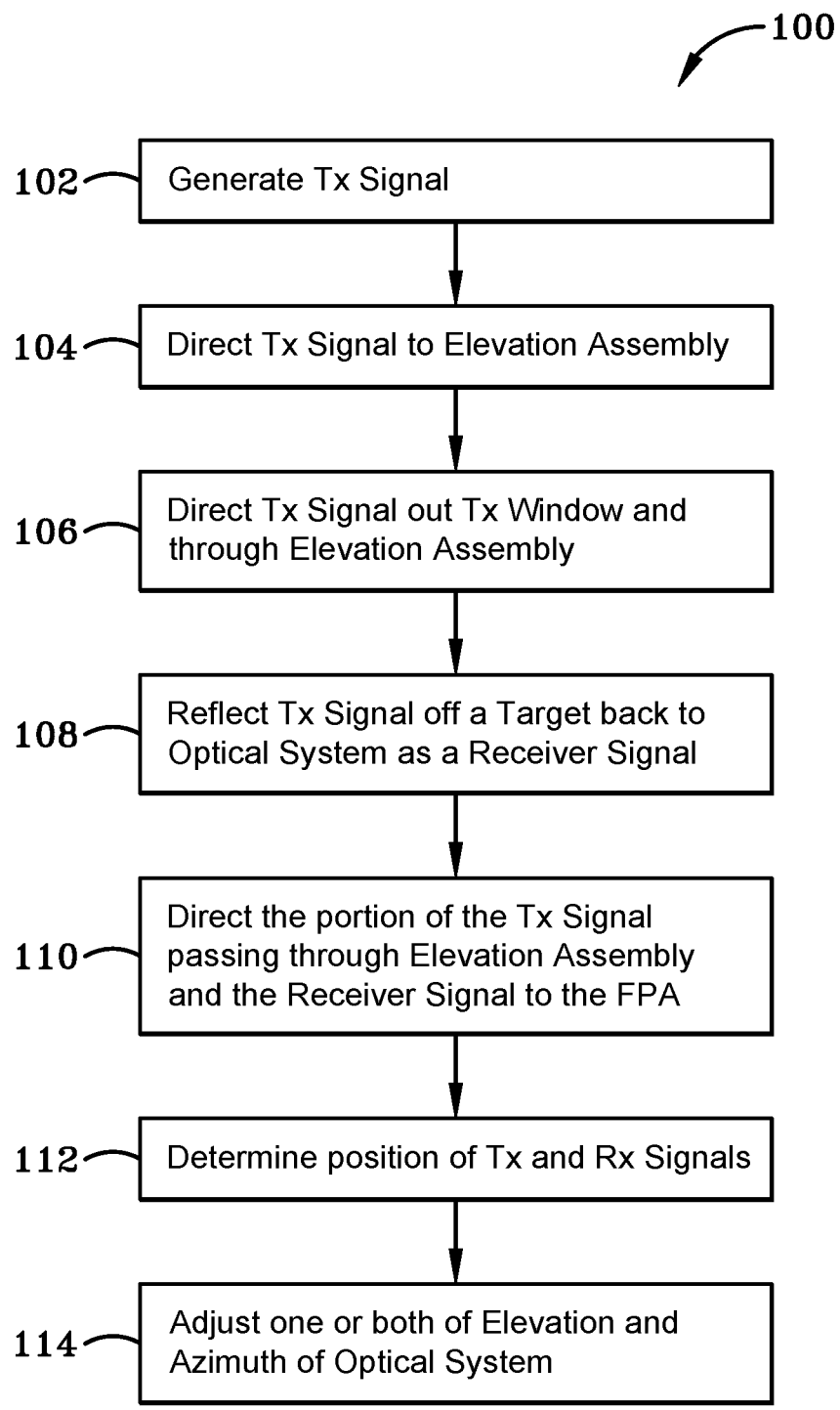
FIG. 6 is an exemplary flowchart depicting an exemplary operation of an exemplary optical system, according to one aspect of the present disclosure.

With reference to FIG. 6, a flowchart generally illustrating above process and is shown and will now be described. As seen therein, the general process is indicated as reference 100.

First, indicated as reference 102, a Tx signal is provided and then directed to the elevation assembly 14, which is indicated as reference 104. Next in process 100, the Tx signal may be split with a majority of the signal being transmitted out or being directed out transmit window 48 towards target 58 while simultaneously allowing a small fraction of Tx signal to pass through the transmission scan mirror 30 and into elevation assembly 14. The directing of the Tx signal out transmit window 48 towards target 58 and through elevation assembly 14 is indicated at reference 108 in process 100.

The Tx signal that exits optical system 10 through window 48 may follow a line of sight which may define a vector between system 10 and target 58. Tx signal may then encounter target 58 where it is then reflected off of the target 58 and back to optical system 10 as the Rx signal. For purposes of illustrating process 100, the Rx signal will be described as a reflected signal from target 58; however, as discussed above, it will be understood that the Rx signal may be any signal, including those that originate at or from target 58, for example, an infrared signal in passive imaging applications. This reflection of the signal off of target and back to optical system 10 is indicated at reference 108 in process 100. As the Rx signal enters optical system 10 through receive window 50, it is directed off of receiver scan mirror 32 where it is joined by the A/B signal, which again is the portion of Tx signal that is directed through the elevation assembly 14, and both signals travel in parallel to the FPA 24 of receiver 12. The directing of both signals to the FPA 24 is indicated at reference 110.

The FPA 24 may then detect both the A/B signal and the Rx signal and may then send signal data to an associated processor, which may then determine an actual position of the Tx signal relative to system 10, target 58, and/or the position of the Rx signal. This actual position of the Tx signal may be the actual line of sight of the transmitted beam/Tx signal. Put another way, the actual position of the Tx signal may be the line of sight of the signal as it actually exists at the time the determination is made. This may further allow processor to determine if the Tx signal is properly aligned and positioned, as discussed below. This determination of signal position is shown at reference 112.

Once the actual position of the Tx signal determination is made, it may be compared to a desired position of the Tx signal. The desired position may be the line of sight, or vector, from system 10 to target 58. Put another way, the desired position may be the line of sight wherein the Tx signal ideally hits the target 58. If the actual position of the Tx signal determined in step 112 is the same as the desired position (i.e. the Tx signal actually hits the target 58 as desired), no adjustments need be made.

If, however, the actual positon of the Tx signal is not the same as the desired position, the Tx signal may be repositioned or realigned relative to target 58 and/or relative to the Rx signal. The difference in the actual position and the desired position of the Tx signal is the error that is to be corrected to provide the desired accuracy to optical system 10. This correction may be accomplished by adjusting the TX optical train to change the line of sight of the Tx signal. Specifically, the FSM 44 of the Tx optical train may be adjusted to change the position of the TX signal. Similarly, the transmission scan mirror 30 may be independently adjusted to change the position of the Tx signal alone. These changes may be performed at the direction of an operator of optical system 10, or may be directed by the processor, and may be performed automatically.

Alternatively, the line of sight of the Tx signal may be adjusted by simultaneously adjusting one or both of the elevation and azimuth position of the elevation assembly 14. Specifically, optical system 10 may adjust one or both of the elevation and azimuth position of the elevation assembly 14 to adjust the line of sight for the TX signal and to properly align and position the Tx signal into the desired position wherein the Tx signal hits the target 58. This adjustment is indicated at reference 114 in process 100 and again may be accomplished via operator input wherein the processor notifies an operator of optical system 10 to make the appropriate adjustments. Alternatively, the adjustment to elevation and/or azimuth positioning may be at the direction of the processor and may be made automatically in response to the determination of signal position from step 112.

While shown and described herein having a specific order of elements and components, it will be understood that the Tx and Rx optical trains may include or omit components as necessary. For example, mirrors, such as fold mirrors 42 and/or 54, may be positioned according to the desired installation parameters and may include additional mirrors or may omit mirrors, as necessary. Similarly, additional optical components may be included within optical system 10, as desired. For example, optical filters 34 may further include other components such as an apodizing stop, which may mitigate any diffraction-induced rings on the receiver. Other components, such as a shutter, may be similarly included, as desired, or as dictated by the desired implementation.

It will be further understood that the specific and relative placement of components may vary, depending upon the installation parameters provided that the Tx signal and Rx signal share the elevation assembly 14 in that they may be simultaneously and commonly adjusted in both elevation and azimuth, as necessary.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A method of performing autoboresight on an optical system comprising:
   providing a transmission signal;
   reflecting a first portion of the transmission signal off of a first scan mirror in operable communication with an elevation assembly carried on an azimuth platter of an optical system;
   directing a second portion of the transmission signal through the first scan mirror into the elevation assembly and out of the elevation assembly through a second scan mirror in operable communication with the elevation assembly;
   detecting a receiver signal with an optical receiver on the azimuth platter; and
   detecting the second portion of the transmission signal with the optical receiver after it exits the elevation assembly through the second scan mirror.

2. The method of claim 1 further comprising:
   determining a desired position of the first portion of the transmission signal relative to the optical system.

3. The method of claim 2 further comprising:
   determining an actual position of the first portion of the transmission signal relative to the optical system from the second portion of the transmission signal and the receiver signal detected by the optical receiver.

4. The method of claim 3 further comprising:
   adjusting at least one of the elevation and azimuth position of the transmission signal based on the actual position thereof.

5. The method of claim 4 wherein adjusting the elevation position of the transmission signal further comprises:
   rotating the elevation assembly to change the elevation of the first and second scan mirrors.

6. The method of claim 4 wherein adjusting the azimuth position of the transmission signal further comprises:
   rotating the azimuth platter to change the azimuth position of the first and second scan mirrors.

7. The method of claim 4 wherein adjusting at least one of the elevation and azimuth position of the transmission signal is performed automatically.

8. The method of claim 1 wherein reflecting the first portion of the transmission signal off of the first scan mirror further comprises:
   reflecting the first portion of the transmission signal to a target remote from the optical system.

9. The method of claim 8 wherein detecting the receiver signal with the optical receiver further comprises:
   receiving a target reflection of the first portion of the transmission signal returning from the target, wherein the target reflection defines the receiver signal after reflecting off of the target; and
   directing the receiver signal through a receiver optical train on the azimuth platter via the second scan mirror.

10. The method of claim 9 wherein the receiver optical train is entirely contained on the azimuth platter.

11. The method of claim 1 wherein providing the transmission signal further comprises:
    generating the transmission signal from a signal source remote from the azimuth platter; and
    directing the transmission signal through a transmit optical train that includes the first scan mirror.

12. The method of claim 1 further comprising:
    separating the transmission signal from the receiver signal with at least one baffle.

13. An optical system comprising:
    a receiver optical train carried on an azimuth platter;
    a transmit optical train separate from the receiver optical train;
    an elevation assembly having a first scan mirror that is included in the receiver optical train and a second scan mirror that is included in the transmit optical train, wherein the elevation assembly is operable to move the first and second scan mirrors in unison; and
    an optical receiver of the receiver optical train operable to detect at least a portion of a transmission signal passing through the elevation assembly and a receiver signal from the receiver optical train simultaneously.

14. The optical system of claim 13 further comprising:
    a motor controller assembly operable to move the elevation assembly.

15. The optical system of claim 13 wherein the azimuth platter further comprises:
    an aperture defined therethrough operable to allow the transmission signal to pass therethrough.

16. The optical system of claim 15 wherein the azimuth platter is rotatable about a central vertical axis to adjust a position of the transmission signal and the receiver optical train simultaneously.

17. The optical system of claim 13 further comprising:
at least one fold mirror in the receiver optical train operable to direct the receiver signal to the optical receiver; and
at least one fold mirror in the transmit optical train operable to direct the transmission signal through a transmit window towards a target.

18. The optical system of claim 17 further comprising:
a first fast scanning mirror included in the receiver optical train; and
a second fast scanning mirror that is included in the transmit optical train.

19. The optical system of claim 13 further comprising:
at least one optical filter in the elevation assembly.

20. The optical system of claim 13 further comprising:
at least one baffle separating the receiver optical train from the transmit optical train.

\* \* \* \* \*